United States Patent [19]

Noorlander

[11] 3,967,586

[45] July 6, 1976

[54] DIAPHRAGM TEAT CUP ASSEMBLY FOR MILKING

[76] Inventor: Daniel O. Noorlander, 1864 S. 568 East, Orem, Utah 84057

[22] Filed: Feb. 5, 1973

[21] Appl. No.: 329,667

[52] U.S. Cl. ............................................. 119/14.53
[51] Int. Cl.² ........................................... A01J 5/04
[58] Field of Search............ 119/14.47, 14.48, 14.49, 119/14.5, 14.51, 14.52, 14.53, 14.36

[56] References Cited
UNITED STATES PATENTS

| | | | |
|---|---|---|---|
| 1,182,107 | 5/1916 | Sharples | 119/14.53 |
| 3,308,788 | 3/1967 | Noorlander | 119/14.52 |
| 3,476,085 | 11/1969 | Noorlander | 119/14.36 |

*Primary Examiner*—Hugh R. Chamblee
*Attorney, Agent, or Firm*—Charles R. Fay

[57] ABSTRACT

A diaphragm teat cup assembly comprising a shell including two mating clear molded plastic parts which hold and secure between them a flexible rubber-like diaphragm dividing the shell into two chambers, one chamber receiving the cow's teat and having a milk tube, and the other chamber having a tube for the application of the pulsation and for receiving required weight.

3 Claims, 8 Drawing Figures

DIAPHRAGM TEAT CUP ASSEMBLY FOR MILKING

BACKGROUND OF THE INVENTION

Attention is directed to my U.S. Pat. Nos. 2,997,980; 3,476,085, and 3,659,557, in which there are generally specified the inadequacies of the prior art, particularly as to inadequate massaging and to the liability of infection. The prior art is distinguished by having cups which are poorly designed and which result in inadequate decongesting of the teat and also of flooding and backflow. Also reference is made to the causes of mastitis. The object of the present invention is to provide a diaphragm teat cup assembly which not only improves the constancy of vacuum and lessens damage to the teats as well as lessening the possibility of mastitis and other bacteria, but also at the same time is made in such a way that it is a disposable item, i.e., when it gets to the point when it wears, it can be thrown away and a new diaphragm applied more economically. Worn and dirty inflations increase the rate of contamination.

SUMMARY OF THE INVENTION

Two clear plastic parts are molded, these parts being complementary to each other and in general forming a cylinder when placed together. One part being open-sided and having at one end a rim for the application of a relatively soft teat receiving cup with a special opening for the reception of the teat therein, and at the opposite end this part has a milk tube; the other complementary clear plastic molded part having an open complementary side provided to form with the first part the cylindrical member, the parts being secured together and holding between them a diaphragm, the diaphragm extending from the teat receiving cup to the milk tube, and forming a pair of chambers in the cylinder, one chamber being the milking chamber and the other chamber receiving the pulsations from the milking machine and also having space for the application of weight as needed in devices of this nature. There are means to detachably connect the two parts together clamping the diaphragm between them in operative condition.

PREFERRED EMBODIMENT OF THE INVENTION

Figure 1:
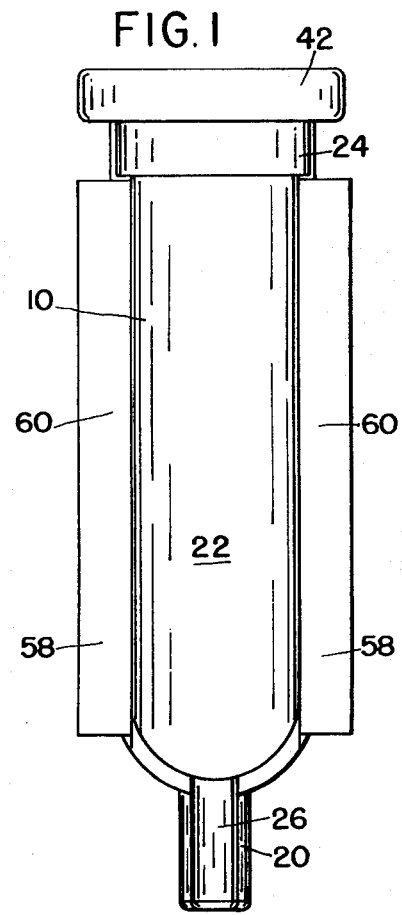
FIG. 1 is a view in elevation showing the new cup.
Figure 2:
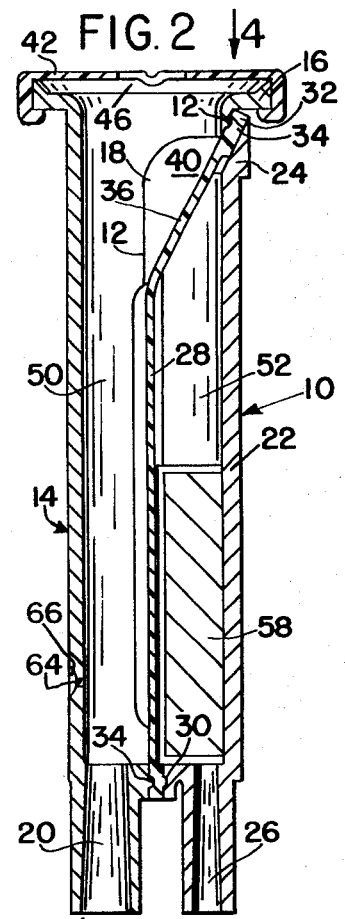
FIG. 2 is a vertical section therethrough.
Figure 3:
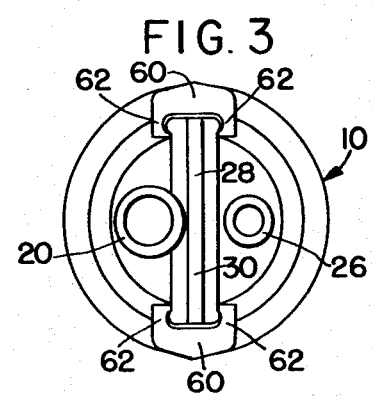
FIG. 3 is an end view in elevation looking in the direction of arrow 3 in FIG. 2.
Figure 5:
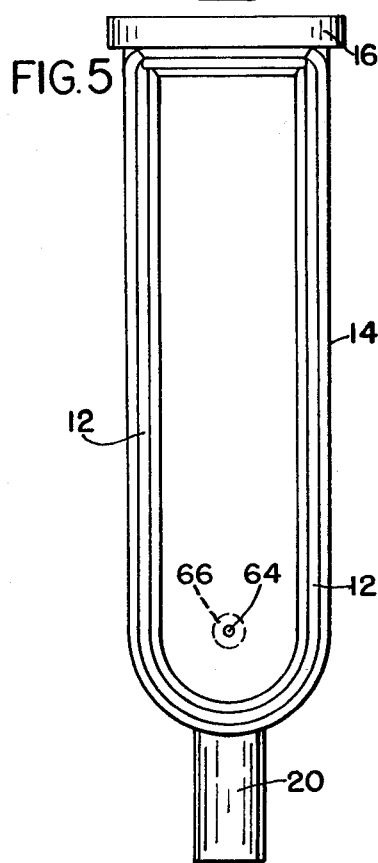
FIG. 5 is a plan view of one of the clear plastic parts.
Figure 6:
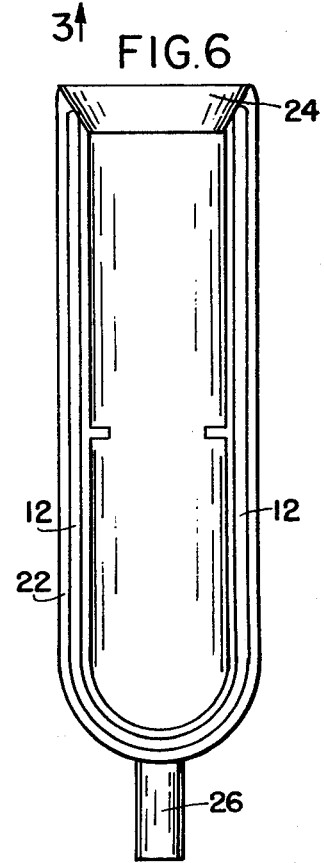
FIG. 6 is a plan view of the other clear plastic parts.

The diaphragm teat cup assembly of the present invention when assembled is in the general form of a cylinder. This cylinder is indicated generally by the reference numeral 10 and it is composed of two parts which are best seen in FIGS. 2, 5 and 6. These two parts are molded of clear plastic non-toxic and have complementary connecting tongue and groove edges indicated at 12. One part generally indicated at 14 is provided with a continuous rim at one end indicated at 16 but curving down and in at 18 continuing to the opposite end thereof and terminating in a complete one-piece milk tube 20.

The other part is of clear molded plastic and is generally indicated at 22. It is not quite as long as member 14, starting at a point 24 and engaging the edges 12 of the member 14 it extends downwardly along the curve 18 to the opposite end thereof where there is provided a tube 26 which is to be applied with respect to the milking machine pulsator.

Figure 7:
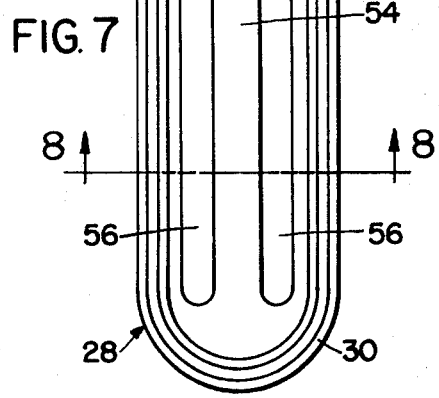
FIG. 7 is a plan view of the diaphragm lying flat.
Figure 8:
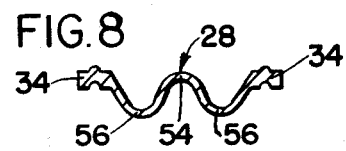
FIG. 8 is a section on line 8—8 of FIG. 7.

A flexible rubber-like diaphragm generally indicated at 28 and shown in FIGS. 7 and 8 is clamped between the two parts, i.e., between the tongue and grooves at 12, 12, and has at one end 30 an arc-shape and at the other end 32 a flat shape. The periphery of the diaphragm has a tongue and groove conformation 34 fitting the complementary fastening tongues and grooves at 12 on the parts 14 and 22. From end 30, the diaphragm assumes the shape of the complementary edges of the molded parts and extends at an angle as at 36 down through the cylinder provided by the two parts 14 and 22.

This rib and groove construction extends completely about the entire diaphragm as do the complementary edges 12 and it will be seen that the diaphragm is clamped all the way around, having an arc-shaped formation as at 40, see FIG. 2, this area being generally deformed because it must conform to the shapes of the edges of the molded parts.

Figure 4:
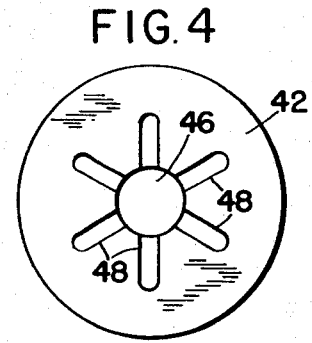
FIG. 4 is an end view of the opposite end looking in the direction of arrow 4 in FIG. 2.

In any event it will be seen that the diaphragm divides the entire cup into two chambers. The test receiving cap 42 is secured as by an underlying circumferential ridge 44 of the enlarged head at 16 of member 14 and this member is provided with an entrance 46 for the teat, this entrance being formed on a radial wave-like conformation shown at 48 in FIG. 4. The diaphragm forms chamber 50 in part 14. Chamber 50 and chamber 52 in part 22 receives the teat held by the cap 42.

The teat is therefore held in position to be pressed upon by the diaphragm at one side only which acts like calf's tongue, instead of squeezing all about the teat. The diaphragm is preferably made with an elongated corrugated conformation provided by a central depression 54 and lateral projections 56, see FIG. 8. This conforms in some measure to the teat.

This construction provides for a proper and uniform massaging action of the teat so as to provide the necessary amount of blood circulation required to maintain the teat in proper health, etc.

The entire milking action can be seen because the member 14 which receives the milk and leads to the tube 20 is completely clear and therefore over-milking is at once apparent to the operator. The diaphragm is made so inexpensively that it can be thrown away after a week's use if this should be found to be desirable.

The chamber 52 formed by the member 22 transfers the pulsing action from the milking machine and also provides room to apply a weight 58, these weights being necessary in order to provide the correct tension to the teat, and to provide proper closure of milk tube over milk tube ferrule when assembly is removed from teat.

The two parts of the device 14 and 22 may be clamped together by means of channel-shaped sliding members 60, 60. These members are provided with outstanding flanges provided for this purpose as seen at 62.

At 64 there is shown an air inlet vent in the wall of part 14 and this vent has all the functions and advantages detailed in my prior Pat. No. 3,476,085, but instead of the necessity of using a plug insert, a simple opening through the wall of part 14 is sufficient. A dished out side conformation as at 66 is advantageous for sanitary and easy cleaning purposes.

I claim:

1. Diaphragm teat cup comprising a generally cylindrical two-part elongated housing, a first part including a head at one end and a milk tube at the opposite end and being open at a side thereof between the head and milk tube, the second part being open at one side complementary to the open side of the first part and being open at the end corresponding to the head end of the first part and having a tube at its opposite end, an elongated diaphragm between said parts, said diaphragm separating the housing into two chambers one of which is in the first part of the housing, the other chamber being formed by the second part and the diaphragm, elongated slidable channel-shaped connectors along the length of the parts at corresponding edges thereof securing the two parts together and the diaphragm between the two parts.

2. The teat cup of claim 1 including a removable and replaceable weight in said other chamber.

3. The teat cup of claim 1 wherein the diaphragm is longitudinally corrugated in general conformance to the teat.

* * * * *